J. H. TALLMAN.
APPARATUS FOR SHOCKING GRAIN.
APPLICATION FILED NOV. 11, 1913.

1,131,171.

Patented Mar. 9, 1915.
8 SHEETS—SHEET 3.

WITNESSES.
N. R. Tyndall.
E. P. Hall.

INVENTOR
J. H. Tallman
BY J. Edward Maybee
ATTY.

J. H. TALLMAN.
APPARATUS FOR SHOCKING GRAIN.
APPLICATION FILED NOV. 11, 1913.

1,131,171.

Patented Mar. 9, 1915.
8 SHEETS—SHEET 4.

WITNESSES.
N. R. Tyndall.
E. P. Hall.

INVENTOR
J. H. Tallman
BY J. Edward Maybee
ATTY.

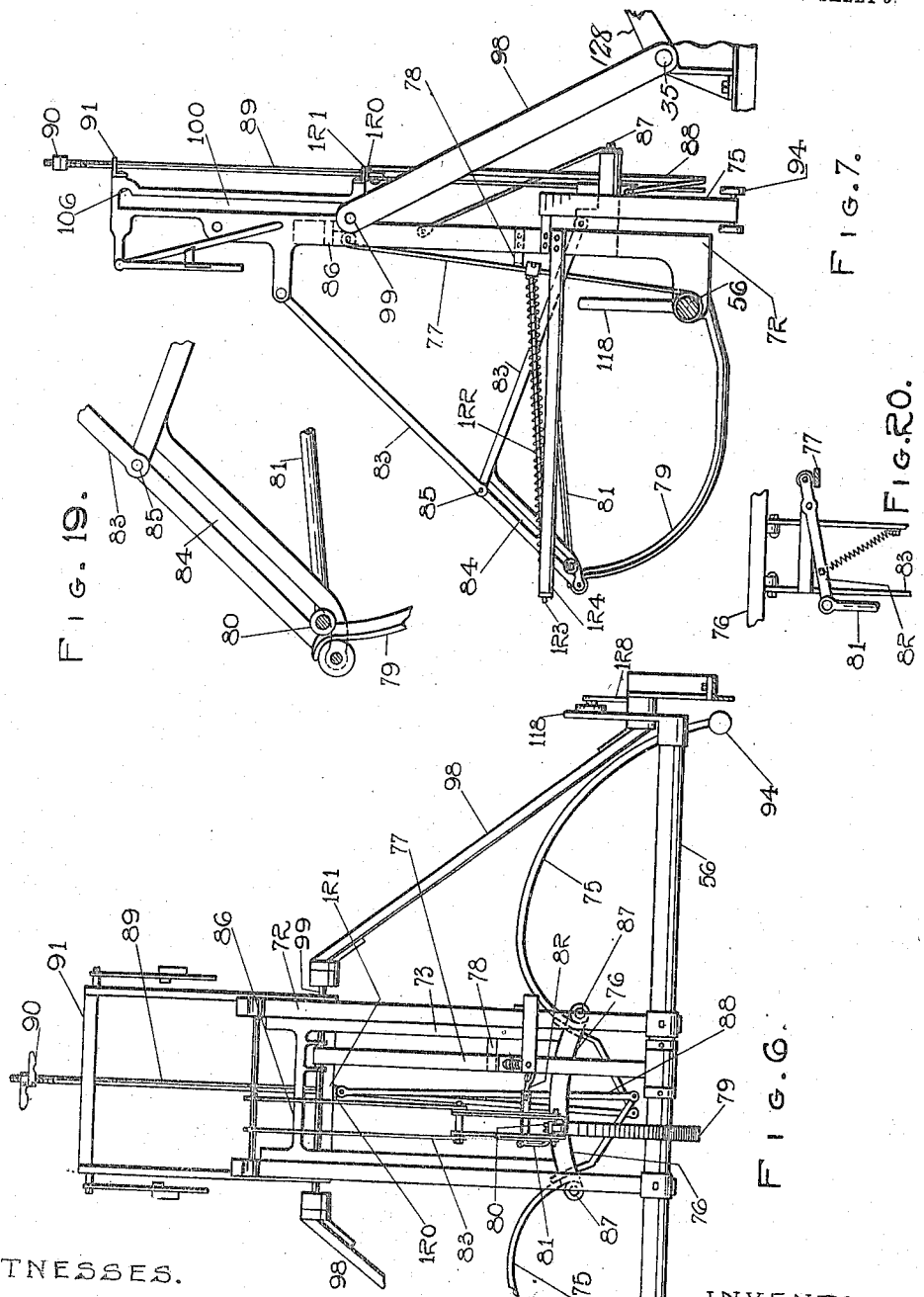

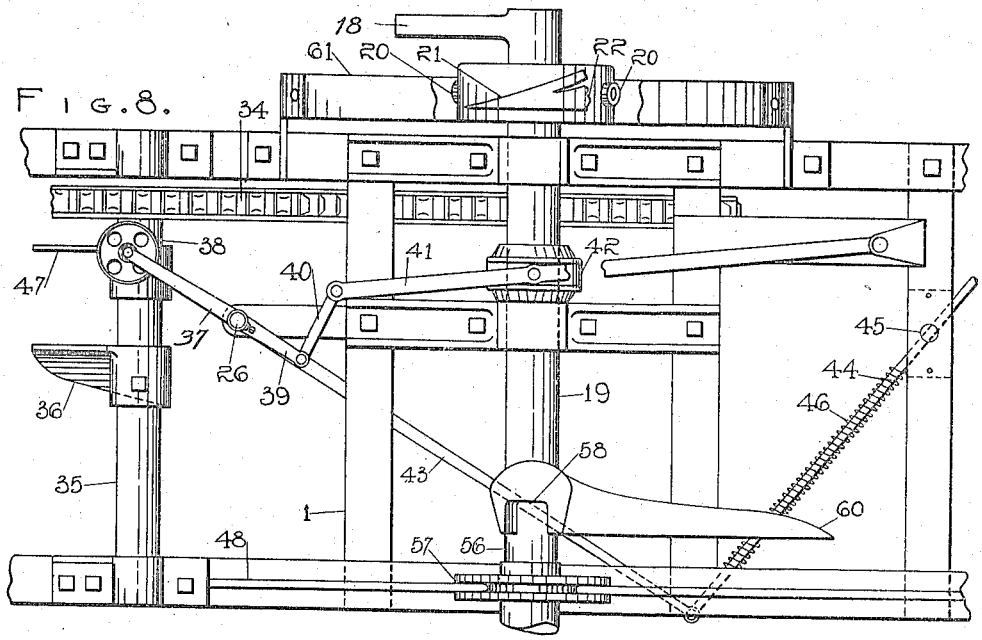
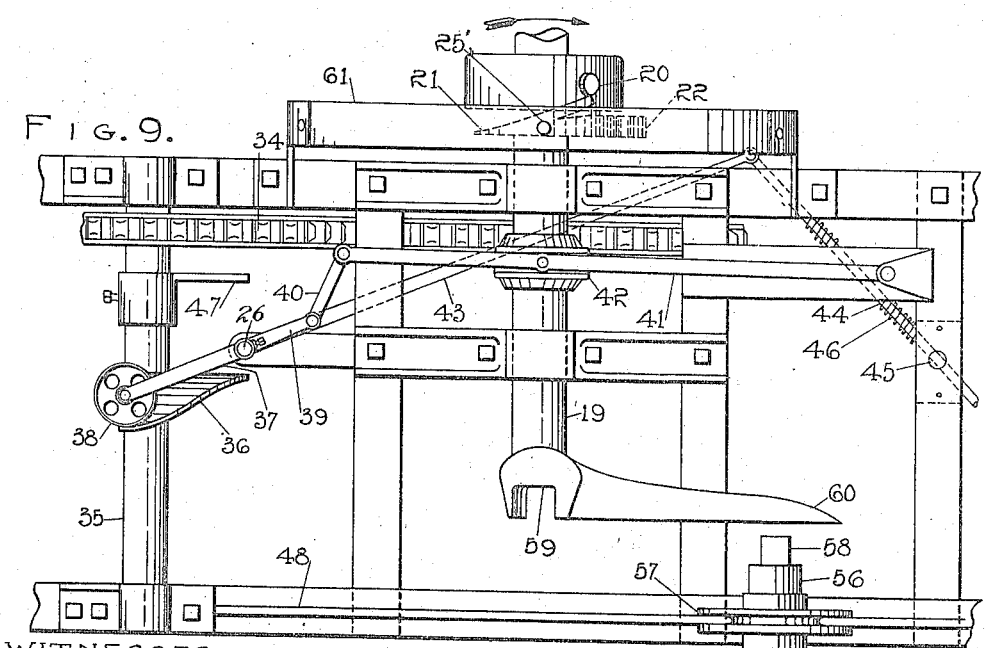

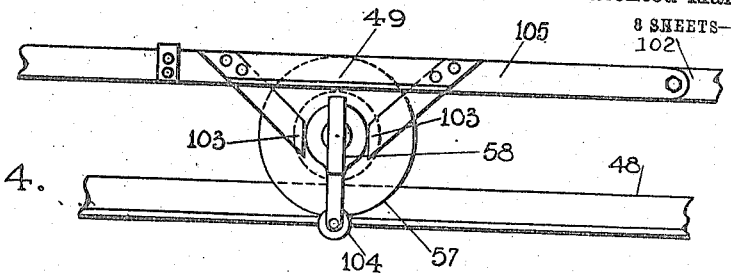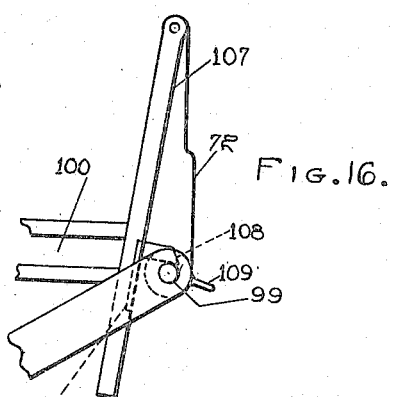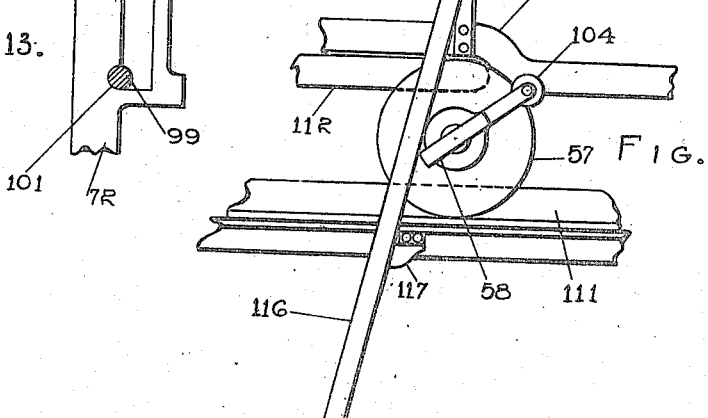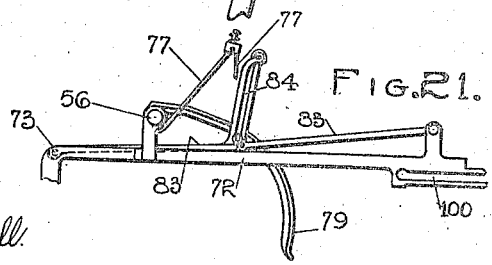

UNITED STATES PATENT OFFICE.

JAMES HERVEY TALLMAN, OF HAMILTON, ONTARIO, CANADA.

APPARATUS FOR SHOCKING GRAIN.

1,131,171.  Specification of Letters Patent.  Patented Mar. 9, 1915.

Continuation of application Serial No. 642,593, filed August 7, 1911. This application filed November 11, 1913. Serial No. 800,320.

*To all whom it may concern:*

Be it known that I, JAMES H. TALLMAN, of the city of Hamilton, in the Province of Ontario, Canada, have invented certain new and useful Improvements in Apparatus for Shocking Grain, of which the following is a specification.

This invention relates to apparatus such as described in my former application, Serial No. 642,593, filed August 7, 1911, and provides means for collecting sheaves as they are discharged from a harvester binder, for forming them into a shock and for depositing the shock in a standing position on the ground, and my object is to devise apparatus which will receive the sheaves in a horizontal position, compress the sheaves when a sufficient number have been received to form a shock, lift the shock and turn it into a substantially vertical position, shift it rearwardly at the same rate as the forward travel of the harvester binder, lower it to the ground while still holding it and finally release it.

I attain my object by means of the constructions hereinafter more specifically described and illustrated in the accompanying drawings in which—

Figure 1:
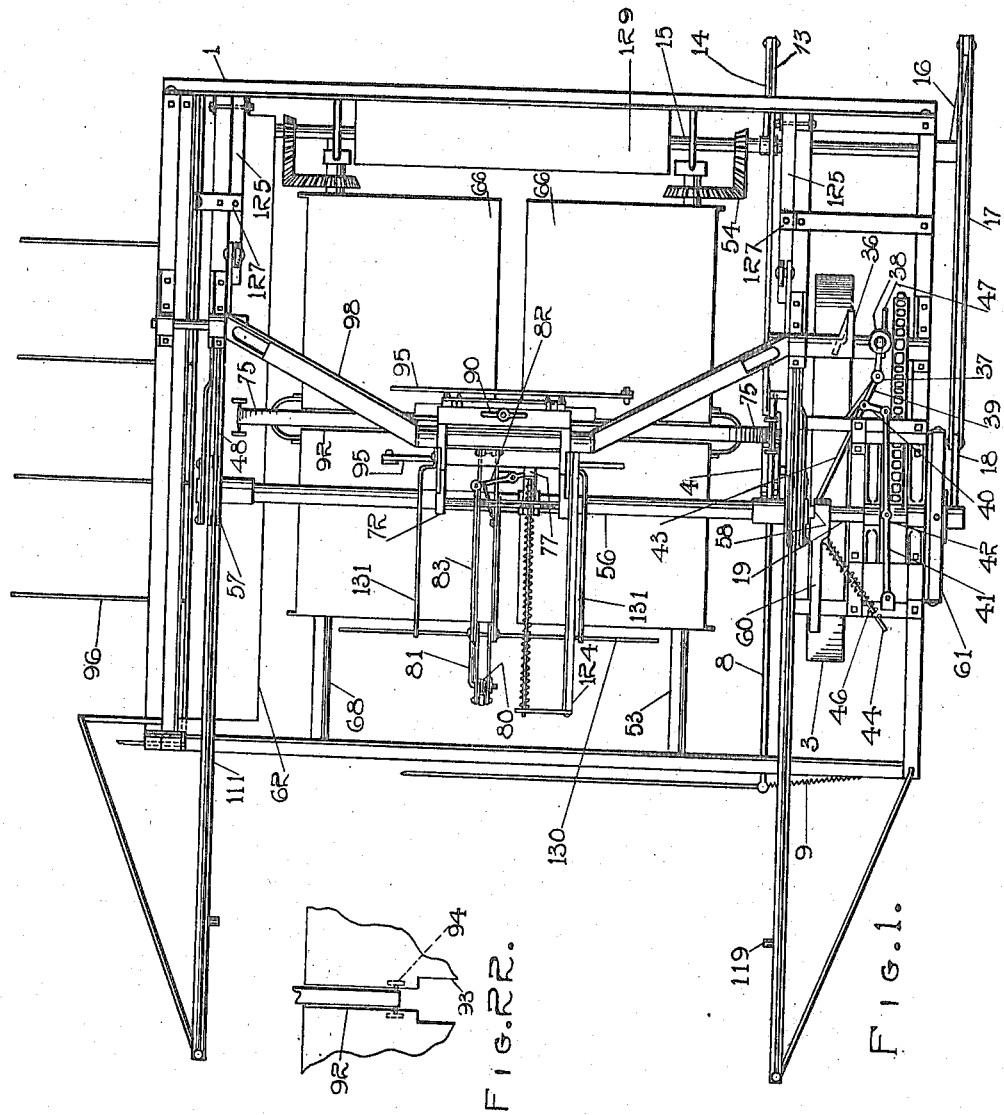
Figure 2:
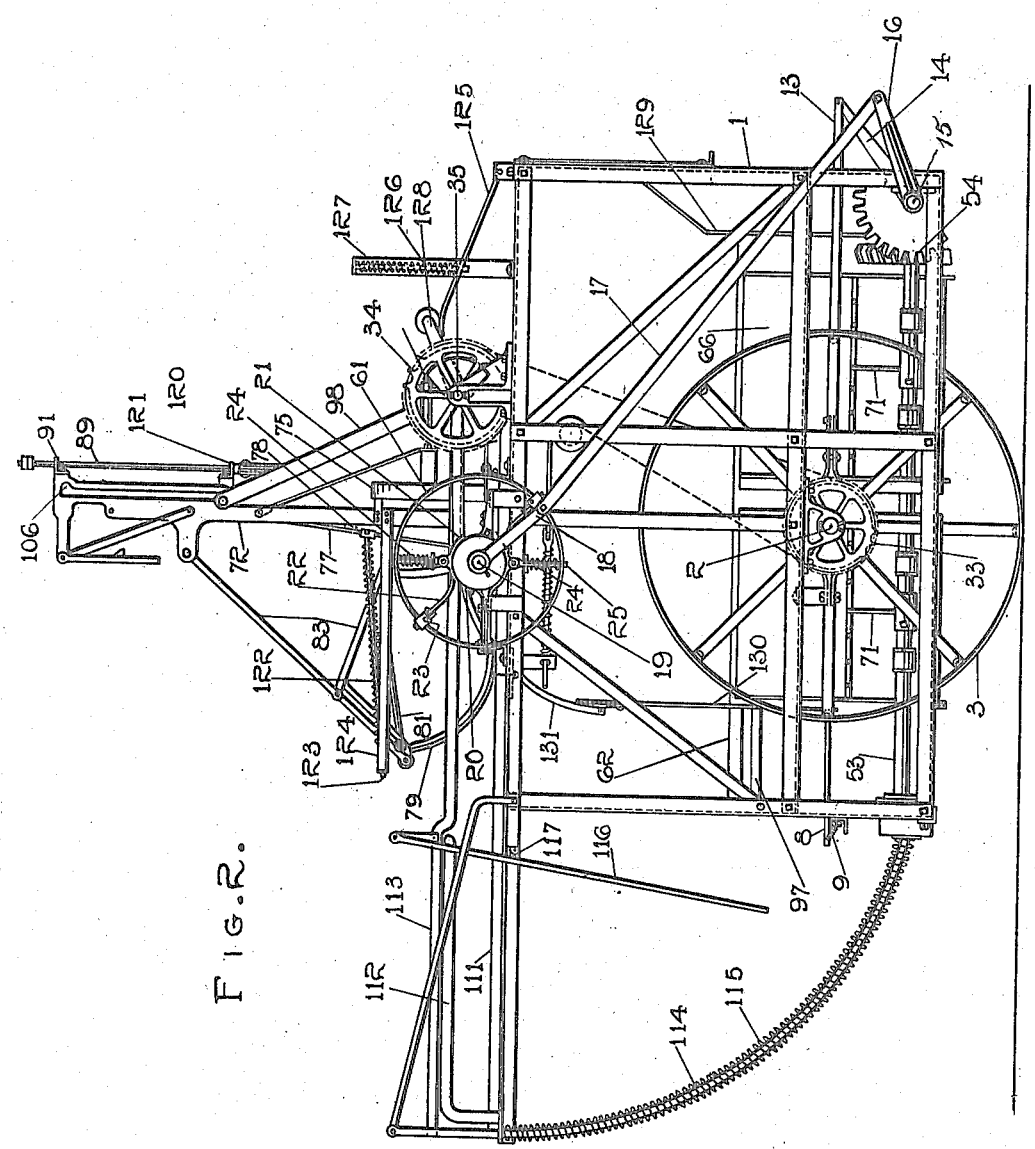
Figure 3:
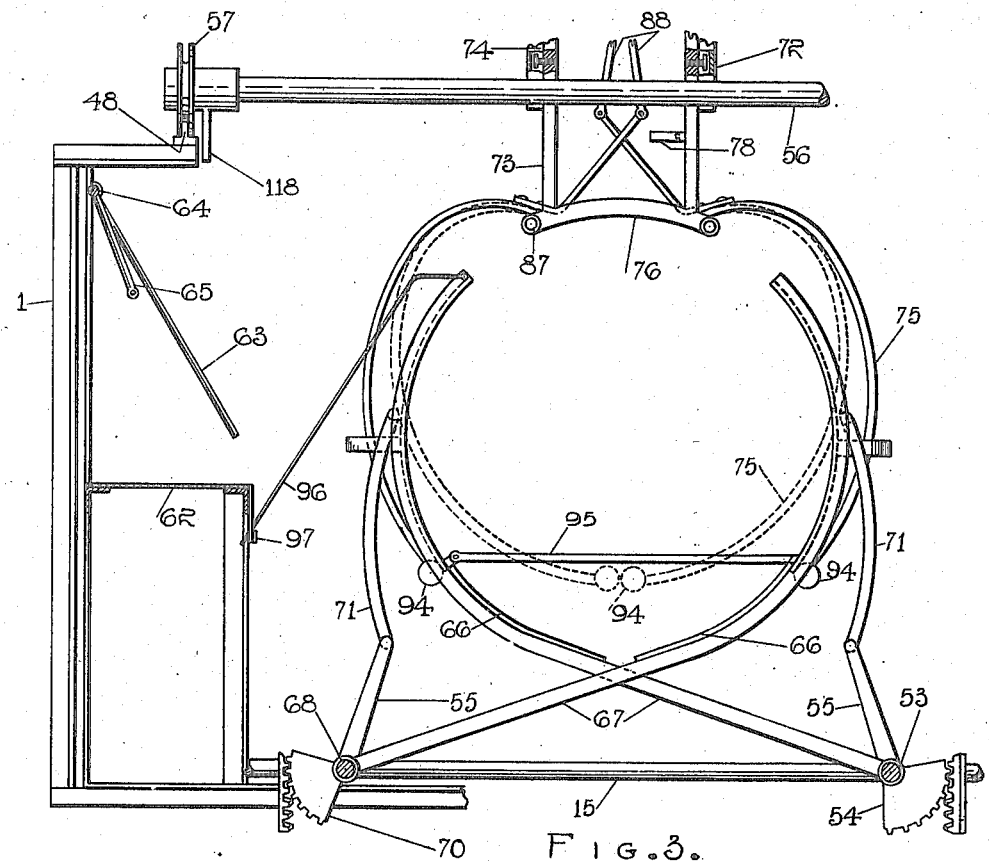
Figures 11, 12:
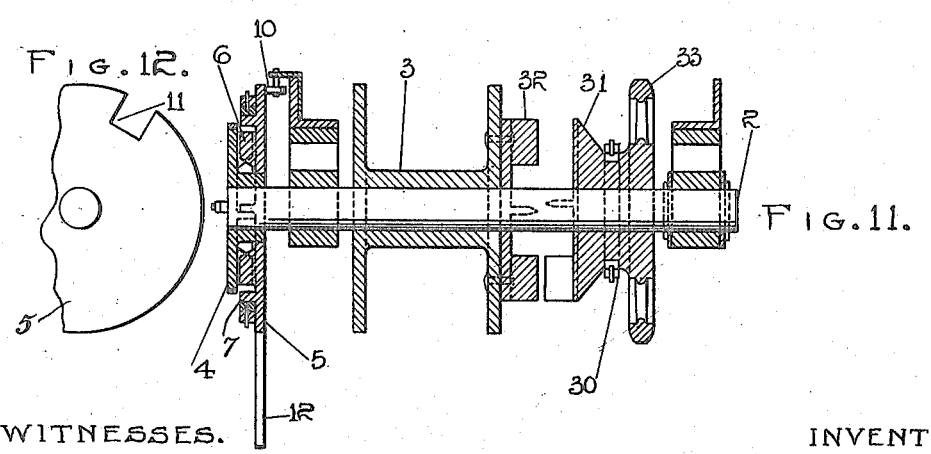
Figure 4:
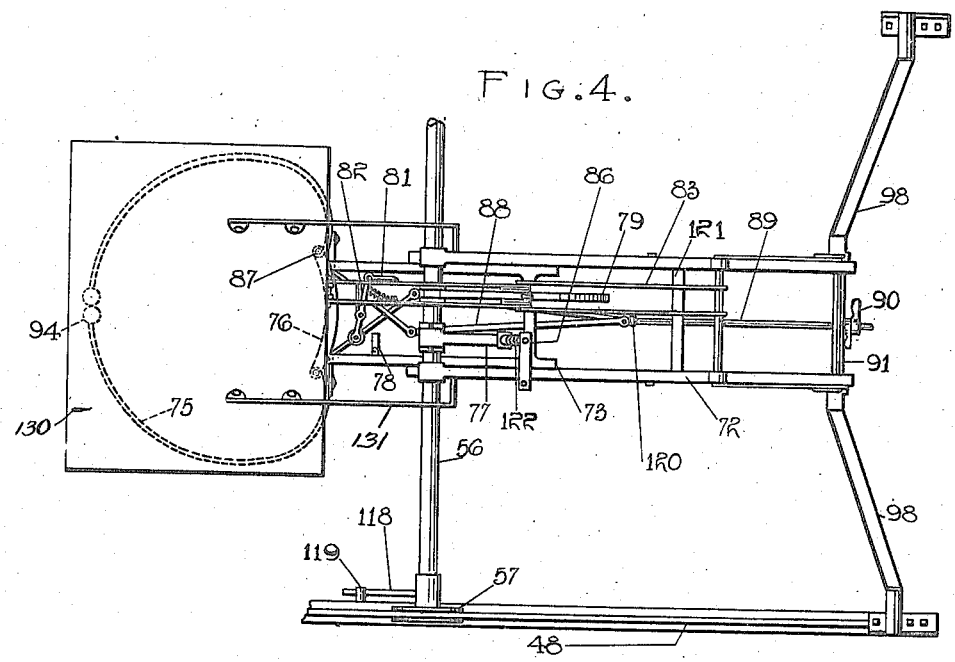
Figure 5:
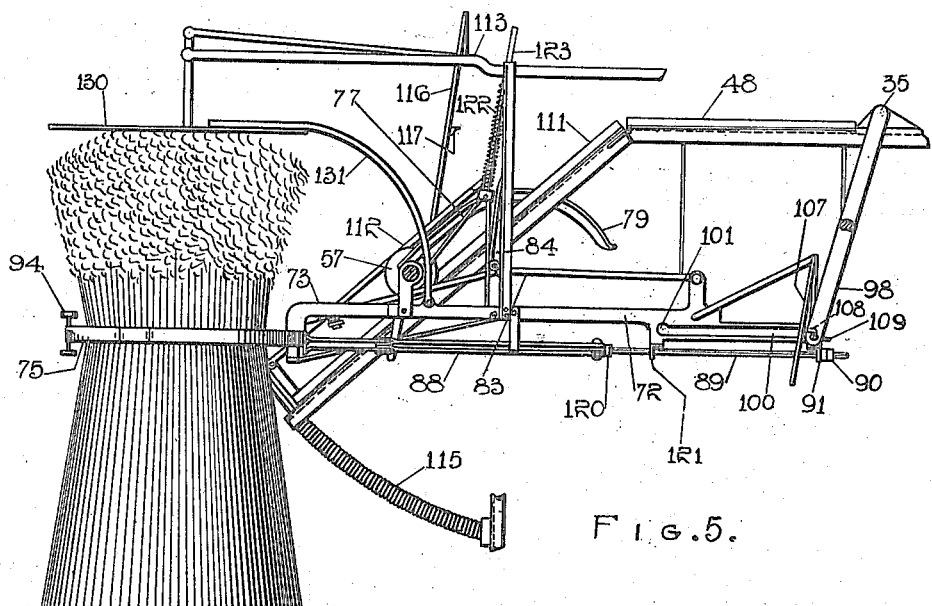
Figure 18:
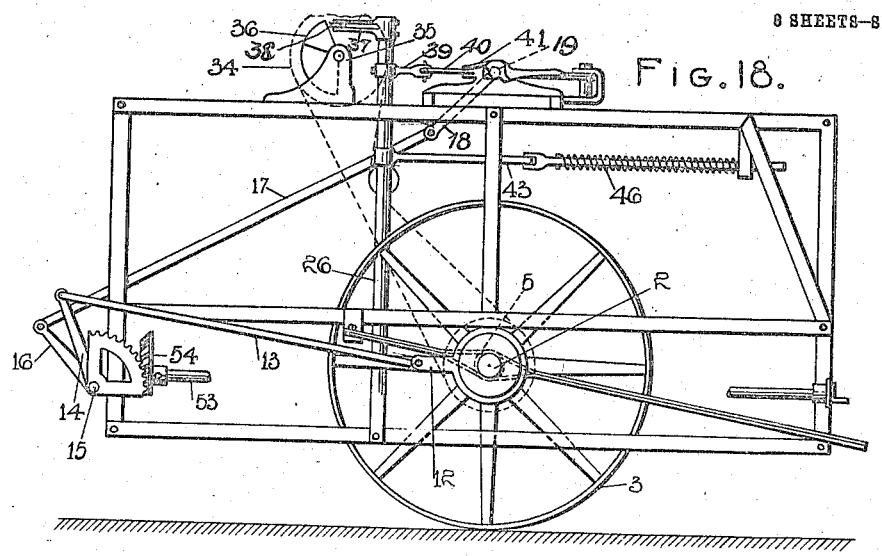
Figure 17:
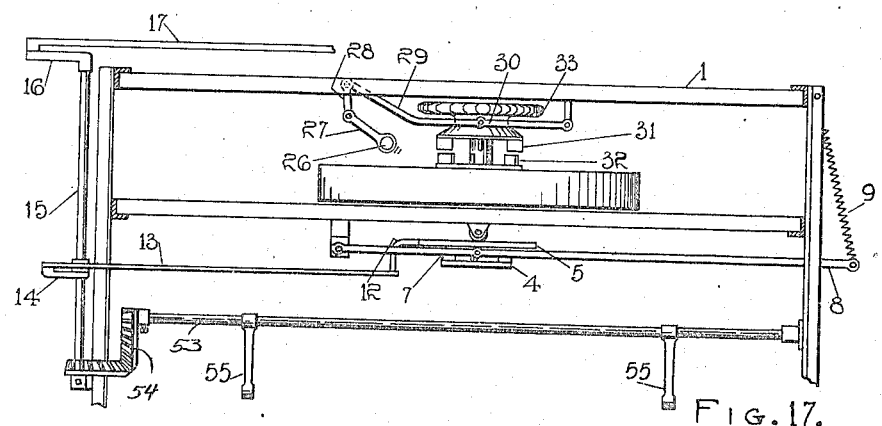
Figure 10:
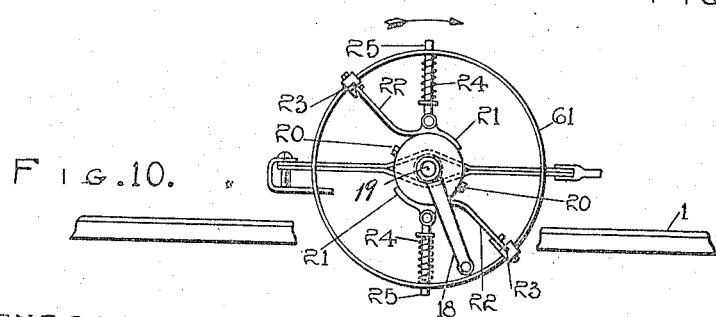

Figure 1 is a plan view of the apparatus;
Fig. 2 is a side elevation of the same; Fig. 3 is a front elevation of part of the apparatus illustrating more particularly the shock receptacle and shock gripping arms. Fig. 4 is a plan view of part of the apparatus showing the shock gripping and depositing mechanism in its rearwardly extended position. Fig. 5 is a side elevation of the same parts. Fig. 6 is an enlarged detail in front elevation of the same parts in normal position. Fig. 7 is a side elevation of the parts shown in Fig. 6. Fig. 8 is a plan view of the mechanism for actuating the shock gripping and depositing mechanism. Fig. 9 is a similar view showing the parts in a different position. Fig. 10 is an end elevation of parts of the same. Fig. 11 is an enlarged sectional detail of the clutches on the axle of the main driving wheel. Fig. 12 is an end elevation, partly broken away, of the disk used in connection with one of said clutches to hold the clutch in engagement. Fig. 13 is a detail in side elevation of the slotted guide on the carriage of the shock gripping and depositing mechanism which is engaged by the crank arms which move the carriage. Fig. 14 is a detail in end elevation showing the means of supporting and locking the shaft carrying the shock gripping and depositing mechanism. Fig. 15 is
a detail in side elevation showing the method of tripping the lock for the hinged rear ends of the guiding tracks on which the shock gripping and depositing mechanism is carried. Fig. 16 is a detail in side elevation of the latch which releasably holds the crank arms moving the carriage of the shock gripping and depositing mechanism at the upper end of its guide. Fig. 17 is a plan view of the lower part of the driving mechanism. Fig. 18 is a side elevation of the driving mechanism of the apparatus looking from the inner side. Figs. 19 and 20 are details of the lock for holding the crosshead carrying the shock gripping arms in its normal position and the trip therefor. Fig. 21 is a detail of the lock for holding the crosshead in the position in which it is when the shock gripping arms are engaged with the shock. Fig. 22 is a detail showing one of the slots in the shock receptacle.

In the drawings like numerals of reference indicate corresponding parts in the different figures.

In the complete machine I employ the mechanism shown and described in my copending application No. 765088, filed May 2nd, 1913, but in order to enable the mode of operation of the machine to be thoroughly understood, it will be necessary to repeat the description of the said mechanism. The purpose of this driving mechanism is to impart an oscillating rotary movement to a shaft for moving endwise and thereafter returning to its original position.

1 is the frame of the apparatus suitably shaped to support the different parts. In this frame is mounted an axle or driving shaft 2, to which is connected the ground wheel 3. One half 4 of a positive clutch is secured to the axle, while loose on the axle is a crank disk 5, to which is secured the other half 6 of the clutch. This crank disk 5 has a grooved hub 7 formed on and connected therewith, with which the shifter lever 8 engages in the usual manner. This shifting lever is pivoted at one end and has a coil spring 9 connected therto and to a stationary part, which coil spring tends to move the shifter lever 8 to release the clutch.

It is most convenient to arrange the device so that once the clutch is thrown in it stays in for one revolution of the crank shaft. For this purpose I provide the anti-friction roller 10 secured to the frame and adapted to engage the back of the disk 5, as shown particularly in Fig. 11. A notch 11 is formed in the disk (see Fig. 12,) in which the roller normally lies, the clutch being released when the parts are in this position. When the shifter lever is moved to throw in the clutch, the roller comes into a position back of the disk, and as the latter, of course, begins to revolve with the driving shaft, the friction roller rotates on the back of the disk until the notch again comes under the roller, when the spring throws out the clutch, the roller entering the notch. This crank disk is provided with the crank arm 12, which by means of the connecting rod 13, actuates the rock arm 14 secured to the countershaft 15 journaled on the frame. The countershaft has a second rock arm 16 secured thereto which through the medium of the connecting rod 17 actuates the rock arm 18 on the driven shaft 19 parallel with the driving shaft, (see particularly Figs. 2, 8, 9 and 18.) This driven shaft is mounted in suitable bearings on the frame so as to be capable of both an oscillating rotary and also a longitudinal sliding movement. It is evident from the above description that this driven shaft will be oscillated by the rotation of the driving shaft, the rock arms being so proportioned as to produce this effect. I desire to move this driven shaft longitudinally in one direction at the end of the oscillatory movement of the shaft in one direction, and to move it in the reverse direction at the end of the oscillatory movement in the other direction. The longitudinal movement of the shaft in one direction is accomplished in the following manner. The projections 20, preferably anti-friction rollers, are formed on a collar secured to the shaft, (see particularly Figs. 2, 8, 9 and 10). These rollers, when the shaft is rotated in the direction of the arrow in Fig. 9 will ride up the inclined planes 21, which are formed on the ends of the members 22 pivoted at 23 on a ring 61 secured to and forming part of the frame of the apparatus. The portions of these members on which the inclined planes are formed are curved inwardly toward the shaft, so that when the shaft is rotated in the direction of the arrow in Fig. 10, the rollers 20 will pass under the members 22 to re-assume the position in front of the inclined planes without any longitudinal movement being imparted to the shaft. The members 22 are yieldingly pressed toward the shaft by means of the coil springs 24, which are preferably arranged on the bolts 25, each secured to one of the members and passing through the ring 61.

From the above description it will be seen that as the shaft is rotated in the direction indicated by the arrow in Fig. 9 it will be moved longitudinally in the direction toward the upper side of said figure. To return the shaft to its original position I provide the following mechanism. The shaft 26 is journaled vertically (see particularly Fig. 18) and at its lower end has a rock arm 27 secured thereto, (see particularly Fig. 17). This rock arm, preferably by means of the pivoted link 28, is connected with the shifter lever 29, which is adapted to coöperate with the collar 30 on the movable half 31 of a clutch concentric with the drive shaft. The other half 32 of the clutch is fixed on the driving shaft. Connected with the movable half of the clutch is the sprocket wheel 33. It is evident that by shifting the clutch, the sprocket wheel may be given a driving connection with the axle as desired. This sprocket wheel is connected by a suitable sprocket chain with the sprocket wheel 34 fastened on the cam shaft 35. This cam shaft has the cam 36 secured thereto. On the vertical shaft 26 is secured a rock arm 37 preferably provided with an anti-friction roller 38, or otherwise adapted to engage the cam.

Another rock arm 39 is connected to the vertical shaft 26, which by means of the pivoted link 40, is connected with a shifter lever 41 pivoted at one end on the frame of the machine, and adapted in the usual manner to engage the grooved shifter collar 42 secured to the shaft 19. It is evident from the construction described that when the shaft is moved longitudinally as previously described, the vertical shaft 26 will be rocked and the clutch 31—32 thrown in. Immediately the cam shaft 35 is started in rotation. The cam 36 engages the anti-friction roller 38 on the rock arm 37, and after a pre-determined period of time rocks the vertical shaft 26 sufficiently far to again throw out the clutch 31—32, stopping the movement of the cam. The rocking of the rock arm 37, it will be seen, also actuates the shifter lever 41 and moves the shaft 19 toward its original position. If the whole of the movement of the shaft in either direction were dependent solely on the mechanism previously described, it is evident that the shaft might become stuck in an intermediate position, and it is desirable therefore to provide means which will snap the shaft quickly to its limit of movement in either direction after a certain portion of the movement has been effected by the means already described. For this purpose I provide the rock arm 43 secured to the vertical shaft 26. The end of this arm is pivotally connected with the slide rod 44, which is connected to part of the frame of the machine so as to be both slidable and rockable therein. Preferably the rod passes through a journaled pin 45, so as to be freely slidable therein. A coil spring 46 is slipped on the rod 44 and engages the pin 45 and a collar on the rod. This spring is normally in a state of compression. It is evident that the action of the spring would tend to throw the rock arm to either side of a line intersecting the axes of the shaft 26 and the pin 45, and that if the pivotal connection between the rod 44 and the rock arm 43 is moved slightly to either side of the said line of centers that the spring will throw the rock arm in either direction and thus through the connections already described move the shaft 19 to its limit of movement in either direction. To insure that the return movement of the shaft 19 to its initial position is not premature, I further provide on the cam shaft 35 the stop 47 opposite the higher parts of the cam 36. The rock arm 37 cannot therefore be moved to the position shown in Fig. 8 until this stop has moved clear of the anti-friction roller 38.

For my purposes, it is necessary to oscillate a second shaft in synchronism with the driven shaft 19. This second shaft 53 is at right angles to the driving shaft 2, and is driven by bevel gearing 54 from the countershaft 15. Rock arms 55 are connected thereto for a purpose which will hereinafter appear. The purpose of oscillating and reciprocating the driven shaft 19 is that at certain intervals I desire to give the movable shaft 56 a rocking movement in one direction. I show a portion of this shaft in Figs. 8 and 9, while it is shown more fully in Figs. 1, 3, 4 and 5, the shaft being provided with rollers 57 adapted to run on the tracks 48. The end 58 of this shaft is flattened (see particularly Figs. 14 and 15) and a suitable socket 59 is formed in the end of the driven shaft 19 to engage with this flattened end. The extended finger 60 is formed on the end of the driven shaft 19 to guide the socket on the end of the shaft 19 to the end 58 of the shaft 56. This finger is preferably of sufficient length so that it will engage the end of the shaft 56 a sufficient length of time before the engagement with the shaft 19 to prevent any premature movement of the shaft 19 toward the shaft 56, which would prevent the shaft 19 being in the proper position at the proper time to engage with the end 58 of the shaft 56. The operation of this portion of the apparatus is as follows: When the driving shaft is thrown in clutch with the crank disk 5 both of the driven shafts 19 and 53 are oscillated. The initial position of the driven shaft 19 is as shown in Fig. 8. The first result of the oscillation of the shaft 19, therefore, is to move it endwise and disengage it from the shaft 56, which is thus left free to be moved away. It will be noted, however, that as soon as the shaft 19 reaches its limit of longitudinal movement in disengaging from the shaft 56 the clutch 31, 32 is thrown in and the cam shaft begins at once to rotate. By the time the driven shaft 19, therefore, has reached its limit of rotary movement in the original direction the cam 36 has caused its return to its initial position ready to engage the shaft 56. The rollers 20 are now beneath the movable members 22 and as the shaft 19 rocks back to its initial position the rollers pass under the ends of the said members and resume again the position shown in Fig. 8.

Having now described the driving mechanism I will now set out the main features of the rest of the machine, and the manner in which they derive their motion from the parts already described. The apparatus is designed to be connected with and drawn by a harvester binder.

At one side of the frame of the machine is located the platform 62, (see particularly Figs. 1, 2 and 3.) Over this platform the sheaves from the harvester binder will be discharged. Their passage may be controlled by means of a hanging gate 63 hinged above and controlling an opening in the frame of the machine. This gate is preferably formed of a series of fingers connected to the rock shaft 64 provided at one end with the crank arm 65, by means of which it may be controlled whenever it is necessary to stop the passage of the sheaves. From this platform the sheaves pass to the shock receptacle. This shock receptacle is formed in two parts, each part comprising a curved portion 66 connected to arms 67, which arms are pivoted on the shafts 68 and 53. The former, like the latter, is driven from the transverse shaft 15 by means of bevel gearing, the gearing being indicated particularly in Fig. 3 and numbered 70. The curved member of each half of the shock receptacle normally lies on one of the shafts 68 and 53 and is connected by means of its arm 67 with the opposite shaft. The curved members 66 form between them a semi-circular receptacle into which the sheaves are deposited. When the shafts 68 and 53 are rocked the parts of the shock receptacle rise to the position shown in Fig. 3, the movement being effected through the medium of the links 71 pivoted on the parts of the shock receptacle and pivoted at their other ends to the rock arms 55 fast on the shaft 68 and 53. In Figs. 1 and 2 the parts of the shock receptacle are shown in their normal position. When a sufficient number of sheaves have been deposited I purpose to elevate the shock, grasp it around the middle by suitable mechanism, convey it rearwardly, turn it to an upright position and deposit it on the ground. This is effected by the mechanism I will now describe.

The shaft 56, as already described, is provided with a roller 57 running on the track 48. Both the roller and track are duplicated at the opposite side of the apparatus. This shaft 56 has secured thereto the carriage 72, which normally occupies the vertical position shown in Figs. 1, 2, 6 and 7. On this carriage the cross head 73 is carried, being vertically movable in the guides 74. On this cross head are pivoted the shock gripping arms 75. The arms are suitably curved to embrace the shock. The lower end 76 of the cross head is of some considerable width, and is preferably curved as shown so that when the arms are in the position shown in dotted lines in Fig. 3, the shock is so gripped as to be approximately circular in section. The crosshead is normally held in the position shown in Figs. 6 and 7 by means of the toggle 77, pivoted on the cross head and on the shaft 56. This toggle normally has its centers out of line and rests against the stop 78. Before the crosshead can be lowered this toggle must be rocked outwardly. This position is indicated in Fig. 5. The toggle is tripped at the proper moment by the rotation of the shaft 56, which is effected as hereinbefore described.

On the shaft is secured a curved rock arm 79. The end of this rock arm bears against an anti-friction roller 80 journaled on the end of the connecting rod 81. The other end of this connecting rod is pivotally connected with one end of the rocking lever 82, which is pivoted on the lower part of the toggle 83, the upper part of which is journaled on the carriage 72 and the lower part on the crosshead 73. Normally this toggle is in the position shown particularly in Figs. 6 and 7.

The outer end of the connecting rod 81 is guided in the slotted guide 84 connected with the lower part of the toggle 83 and normally substantially parallel to the upper part of the toggle. As soon as the shaft 56 starts to rotate the curved rock arm 79 presses against the roller 80 and breaks the toggle 77, which allows the cross head 73 to drop to the position shown in Fig. 3. In this position the toggle 83 will have straightened out and its center pivot 85 will have crossed the line of centers of its end pivots, occupying the position shown in Figs. 5 and 20. The toggle will then hold the cross head in the position to which it has moved until the center pivot is pushed to the other side of the line of centers as hereinafter described.

When the crosshead has dropped, the toggle 83 will contact with the cross bar 86 of the crosshead, which prevents it rocking too far past the line of centers and collapsing again on the other side. The inner ends of the shock gripping arms 75 extend past their pivots 87 and are connected with the lower ends of the links 88, the upper ends of which are pivotally connected with the lower end of a rod 89 sliding in suitable parts of the carriage 72. The upper end of this rod is provided with an adjusting nut 90 screwed thereon and provided also with a clamp nut. When the cross head drops, the nut 90 contacts with the member 91 of the carriage and holds up the inner ends of the shock gripping arms 75. The weight of the descending parts thus causes the arms 75 to swing inwardly to grip the shock. These shock gripping arms work through the slots or divisions 92 dividing the parts of the shock receptacle transversely.

Each slot, it will be noticed has an enlargement 93 at its inner end. The end of each shock gripping arm is provided with the anti-friction rollers 94, which form an end to each arm of greater width than the arm. These rollers will not pass through the main portion of the slots, but will pass freely through the enlargements. The result is that the shock gripping arms pass downwardly outside the parts of the shock receptacle until the arms have descended and the parts of the shock receptacle have ascended sufficiently far to enable the rollers 94 to pass through the enlargements 93. This occurs when the lower ends of the shock gripping arms have passed well down toward the bottom of the shock receptacle, when they spring inwardly and grip the shock, relieving the shock receptacle from the duty of supporting the same. To assist in compressing the shock and to raise its lower side above the enlargements 93, I provide the compressor bars 95, each pivoted on one half of the shock receptacle and having its other end adapted to ride up the curved inner surface of the opposite half, (see Fig. 3.) With these compressor bars the curved member 76 of the cross head coöperates to compress the shock vertically, the lateral compression being, of course, effected by the inward swing of the parts of the shock receptacle.

When the parts of the shock receptacle rise, as shown in Fig. 3, a gap is left between the shock receptacle and the platform 62, into which a sheaf might drop. I therefore provide the bars 96 which are pivoted on the part of the shock receptacle adjacent the platform near its upper end and which ride over a bar 97 below the platform, being thus drawn out as indicated in Fig. 3 to close the gap when the parts of the shock receptacle swing up.

The carriage being supported on the shaft 56 and being pivoted thereon, requires a suitable support to hold it in its vertical position. The carriage is supported and also swung as hereinafter described by means of the crank arms 98, which are connected by means of the wrist pin 99. One of these crank arms is secured to the end of the shaft 35, and the other is pivoted at the far side of the machine in alinement with the axis of the said shaft. The wrist pin is adapted to slide in the vertical guides 100 secured to the carriage 72. When the parts are in the position shown in Fig. 1, the wrist pin 99 lies in the notches 101 at the lower ends of the guides, (see particularly Fig. 13.) The carriage thus is braced in its vertical position. It is also desirable to provide means other than the engagement between the shafts 19 and 56 to retain the latter in the position shown in Figs. 1 and 2. I therefore provide the latches 105, each of which is pivoted on one of the bars 102 forming an upper guide rail above one of the tracks 48 and being engaged by the roller 57.

Each latch is provided with the shoulders 103 to engage on each side of the adjacent end of the shaft, (see Fig. 14.) The shoulders preferably have inclined backs so that they will slide over the shaft as the latter moves to latch engaging position. As these latches must be raised ere the shaft can be rolled rearwardly on the tracks, I provide the shaft ends with the anti-friction rollers 104, which, as the shaft rotates, come into engagement with the flanges 49 on the latches and lift the latter clear of the shaft, leaving the shaft free to move as may be necessary.

After the shaft 56 has been rotated sufficiently through the rotation of the shaft 19, the latter is drawn back as hereinbefore described, leaving the shaft 56 free. At this time the shaft 35 is in rotation and the crank arms 98 connected thereto are rocked. The first action of these crank arms is to move the wrist pin 99 to the upper ends of the guides 100. Here the wrist pin drops into the notches 106, (see Figs. 13 and 16,) and as the carriage swings toward the horizontal the wrist pin is locked in these notches by means of the latches 107, which are pivoted on a suitable part of the carriage, and are provided with the projections 108 which engage above the wrist pin as shown. The latches, after once engaging, remain in engagement until after a rotation of the crank arms 98. The carriage is brought back nearly to its normal position when the projections 109 on the crank arms engage the flanges 110 on the latches and press the latches out of engagement with the wrist pin. The wrist pin being in engagement with the notches 106 as already described, continued rotation of the crank arms draws the carriage down toward the horizontal and at the same time pushes the shaft 56 rearwardly, the latter having been disengaged by the raising of the latches 105 as already described. The shaft is moved rearwardly by the rotation of the crank arms at substantially the same speed as the machine is traveling forward. The carriage remains in a substantially horizontal position as it moves back with the shaft, the shock which has been gripped by the arms 75 and lifted by them from the shock receptacle being held in a substantially vertical position.

It will be noticed that the tracks 48 are provided with the hinged rearward extensions 111. Each of these rearward extensions is provided with an upper guide rail 112 suitably supported from the outer end of the extension. The upper guide rails 102 of the tracks 48 are jogged upwardly at 113 above the guide rails 112, and at their rearward ends are connected with the quadrant bars 114 connected at their lower ends to the frame of the apparatus. These quadrant bars pass through openings in the ends of the rearward extension tracks 111. On the quadrants are located coil springs 115 tending to yieldingly maintain the rearward extensions in their normal position. They are also positively, but releasably held in normal position by means of the latches 116 pivoted on the guide rails 113 and provided with shoulders 117 adapted to engage below suitable projections on the rearward extensions 111. As soon as the carriage is moved rearwardly sufficiently far, the ends of the shaft 56 or any suitable parts moving therewith, engage the latches 116 and release the rearward extension tracks 111. The weight of the shock and the parts carrying it causes the shock carrying arms with the shock carried thereby to drop toward the ground, the rollers 57 rolling down the rearward extensions 111 until the butt end of the shock strikes the ground. By the time this occurs the fingers 118 secured to the shaft 56 come in contact with the projections 119 on the inner sides of the extensions 111. This effects a rocking movement of the shaft 56 owing to the fact that the latter is still moving rearwardly. This rocking movement of the shaft 56 causes the curved rock arm 79 to engage the end of the guide 84 of toggle 83 and force the latter past the line of centers back toward its original position, thus leaving the carriage free to move toward its normal position. The curved rock arm continues to press the center pivot of the toggle and forces the cross head toward its normal position in the carriage. On the rod 89 is formed the shoulder 120. This shoulder 120, as the carriage moves backward, strikes the cross bar 121 through which the rod 89 is guided and prevents the farther movement toward the cross bar of the inner ends of the shock gripping arms 75, which latter are thus forcibly swung open as the cross head is being steadily pressed toward its normal position relative to the carriage by the action of the curved rock arm 79. Thus, as soon as the shock reaches the ground, the shock gripping arms are opened wide, leaving it entirely free and standing on the ground.

It will be noted that a coil spring 122 is placed on a rod 123, which is pivotally connected at one end with the center of the toggle 77, its other end passing freely through a hole in a supporting bar 124 extending outwardly from the carriage. This spring, as soon as the curved rock arm 79 has started the movement of the cross head to its normal position by rocking the toggle 83, assists in the return movement owing to its tendency to straighten out toggle 77 and return it to the position shown in Figs. 1, 2, 6 and 7.

As soon as the shock has been released the springs 115 return the track extensions 111 to their normal position. The continued movement of the crank arms 98 returns the shaft 56 toward its initial position where it is again engaged by the shaft 19 as previously described. Before this vertical position is reached, the projections 109 have engaged the flanges 110 and released the latches 107 as has been described.

The final movement to the vertical position is by means of the following spring actuated mechanism. Curved tracks 125 are pivoted by their ends at opposite sides of the machine. These tracks are yieldingly drawn upward by means of the coil springs 126, each connected to one of the tracks and to a bracket 127 connected to the frame of the apparatus. On each crank arm 98 adjacent to the axis on which it rotates, is secured an arm 128 provided with an anti-friction roller. These engage the curved tracks 125 before the shaft 56 has returned to its initial position and put a tension on the springs. As soon as the shaft 56 reaches its initial position and is engaged by the shaft 19 the driving mechanism goes out of clutch and the tension of the springs 126 is depended upon to make the final movement in return of the carriage to its initial vertical position with the wrist pin of the cranks 98 at the bottom of the guides 100 and lying in engagement with the notches 101.

It should be noted that the instant the shock gripping arms 75 have grasped the shock that the parts of the shock receptacle begin to return to their normal position, and no rotary movement of the shaft 56 takes place until the parts of the shock receptacle have returned to their normal position. This delay in the rotation of the shaft 56 is due to the shape of the notch 59 in the end of the shaft 19. This is made so wide relative to the flattened end 58 of the shaft 56 that the shaft 19 may effect a considerable movement of rotation before a driving engagement occurs with the sides of this flattened end, thus giving the dwell desired.

The mode of operation has been more or less fully described as the constructions concerned have been described. It will be merely necessary to indicate the main features of the operation of the machine.

As soon as a sufficient number of sheaves have been received from the harvester binder, the gate 63 is raised to hold back on the binder deck on the harvester any sheaves which may be bound while the shocker is operating. The shifter lever 8 is then operated, throwing the machine in gear. This effects a rotary movement of the shaft 19, followed by an endwise movement. This movement of the shaft 19 effects the partial rotation of the shaft 56 which trips the cross head carrying the shock supporting arms, thus causing the latter to descend to grasp the shock which has been lifted and compressed by the upward and inward movement of the shock receptacle, which takes place as soon as the machine is put in gear. Following these preliminary movements, the shaft 19 is moved endwise to release the shaft 56. At the time that the shaft 19 is moved endwise to release the shaft 56, the shaft 35 is started in motion due to the throwing in of the clutch 31—32. The shaft 56 is then pushed backward through the rotation of the crank arms 98 rocking the sheaf carrying means to horizontal position and carrying the shock which has been raised from the shock receptacle rearwardly at the same rate as the forward travel of the apparatus. The shock is then lowered to the ground, the shock gripping arms released and the parts returned to their normal position as already described. The driving mechanism is then thrown out of gear as already described. The apparatus is also preferably provided with a butt board 129 (see particularly Figs. 1 and 2), which butt board is fixed to the frame of the apparatus. A head board 130 is also provided connected by means of the arms 131 to the carriage 72, (see particularly Figs. 1, 2, 4 and 5.) Between this head and butt board the sheaves are dropped, and being thus restrained the sheaves form a symmetrical shock with the bottoms of the sheaves substantially even, giving the shock a good base to stand on. It will be noted that as the head board travels with the carriage 72, that it exerts a restraining influence on the shock until the latter is tipped to the vertical position ready for dumping.

From the above description it will be seen that I have devised apparatus which will satisfactorily accomplish the objects of my invention as set out in the preamble to this specification.

What I claim as my invention is:

1. In grain shocking apparatus the combination of a shock receptacle; pivoted shock-gripping arms independent of the receptacle; a horizontally traveling carriage therefor; means for closing said arms to grip a shock and for opening them to release it; and means for moving the carriage rearwardly and for tilting it to bring said arms to a substantially horizontal position.

2. In grain shocking apparatus the combination of a shock receptacle; pivoted shock-gripping arms; a horizontally traveling carriage therefor; means for closing said arms to grip a shock and for opening them to release it; means for moving the carriage rearwardly and for tilting it to bring said arms to a substantially horizontal position: and means for bodily lowering the carriage at the rearward end of its path.

3. In grain shocking apparatus the combination of a shock receptacle; pivoted shock-gripping arms; a horizontally traveling carriage therefor; means for closing said arms to grip a shock and for opening them to release it; means for moving the carriage rearwardly and for tilting it to bring said arms to a substantially horizontal position; means for bodily lowering the carriage at the rearward end of its path and for raising it after the discharge of a shock.

4. In grain shocking apparatus the combination of a shock receptacle adapted to receive sheaves and compress them into a shock; pivoted shock-gripping arms independent of the receptacle; a horizontally traveling carriage therefor; means for moving said arms on the carriage toward and from the shock receptacle and for closing said arms to grip a shock and for opening them to release it; and means for moving the carriage rearwardly and for tilting it to bring said arms to a substantially horizontal position.

5. In grain shocking apparatus the combination of a shock receptacle adapted to receive sheaves and compress them into a shock; pivoted shock-gripping arms; a horizontally traveling carriage therefor; means for moving said arms on the carriage toward and from the shock receptacle and for closing said arms to grip a shock and for opening them to release it; means for moving the carriage rearwardly and for tilting it to bring said arms to a substantially horizontal position; and means for bodily lowering the carriage at the rearward end of its path.

6. In grain shocking apparatus the combination of a shock receptacle adapted to receive sheaves and compress them into a shock; pivoted shock-gripping arms; a horizontally traveling carriage therefor; means for moving said arms on the carriage toward and from the shock receptacle and for closing said arms to grip a shock and for opening them to release it; means for moving the carriage rearwardly and for tilting it to bring said arms to a substantially horizontal position and means for bodily lowering the carriage at the rear end of its path and for raising it after the discharge of a shock.

7. In grain shocking apparatus the combination of a shock-receiving and holding mechanism comprising a shock receptacle formed of two parts each pivoted on the frame of the apparatus and movable toward one another; a cross head movable from above toward said receptacle; shock-gripping arms pivoted on said cross head and means for simultaneously lowering said cross head and closing said arms.

8. In grain shocking apparatus the combination of a shock-receiving and holding mechanism comprising a shock receptacle formed of two parts curved transversely each pivoted on the frame of the apparatus and movable toward one another; a cross head movable from above toward said receptacle; shock-gripping arms pivoted on said cross head; means for simultaneously lowering said cross head and closing said arms; and a bottom compressor pivoted on one half of the receptacle and having its free end riding on the curved inner surface of the other half.

9. In grain shocking apparatus the combination of a shock-receiving and holding mechanism comprising a shock receptacle formed of two parts each pivoted on the frame of the apparatus and each having a slot dividing it transversely; a pair of shock-gripping arms; means for moving said arm toward and from the shock receptacle and for opening and closing them, said arms operating through said slots.

10. In grain shocking apparatus the combination of a shock-receiving and holding mechanism comprising a shock receptacle formed of two parts each pivoted on the frame of the apparatus and each having a slot dividing it transversely and provided near its lower end with an enlargement; a pair of shock-gripping arms; means for moving said arms toward and from the shock receptacle and for opening and closing them, said arms operating through said slots; and an enlargement at the end of each arm of such a size as to pass only through the enlargement aforesaid and not through the slot.

11. In grain shocking apparatus the combination of a frame having a vertical opening therein for the passage of a sheaf; a horizontally hinged gate movable to open and close said opening; a sheaf receptacle formed in two parts pivoted on the frame of the apparatus substantially parallel to the length of said opening; a platform between said opening and the receptacle; and means pivoted to one half of the shock receptacle and freely movable over a support adjacent the platform to close the gap between the receptacle and the platform when the parts of the former are swung up.

12. In grain shocking apparatus the combination of a platform over which sheaves may travel; a sheaf receptacle adjacent the platform formed in two parts pivoted on the frame of the apparatus substantially parallel to the length of the platform; and means pivoted to one half of the shock receptacle and freely movable over a support adjacent the platform to close the gap between the receptacle and the platform when the parts of the former are swung up.

13. In grain shocking apparatus the combination of a sheaf gripping, carrying and depositing means comprising a carriage; longitudinal tracks; means for moving said carriage along said tracks; means for tilting said carriage from the vertical to the horizontal while it travels rearwardly and vice versa; opposed sheaf gripping arms carried by and movable independently of said carriage; means for closing said arms while the carriage is vertical; and means for releasing them when the carriage is horizontal and at the rearward end of its travel.

14. In grain shocking apparatus the combination of a sheaf gripping, carrying and depositing means comprising a carriage; longitudinal tracks having their rearward portions hinged to swing downwardly; latches normally holding said rearward portions in their normal position; means for moving said carriage along said tracks; means for tilting said carriage from the vertical to the horizontal while it travels rearwardly and vice versa; sheaf gripping arms carried by said carriage; means for closing said arms while the carriage is vertical; means for releasing them when the carriage is horizontal and at the rearward end of its travel; and means whereby the carriage trips the aforesaid latches when at the rearward end of its travel.

15. In grain shocking apparatus the combination of a sheaf gripping, carrying and depositing means comprising a carriage, longitudinal tracks having their rearward portions hinged to swing downwardly; latches normally holding said rearward portions in their normal position; means for moving said carriage along said tracks; means for tilting said carriage from the vertical to the horizontal while it travels rearwardly and vice versa; sheaf gripping arms carried by said carriage; means for closing said arms while the carriage is vertical; means for releasing them when the carriage is horizontal and at the rearward end of its travel; means whereby the carriage trips the aforesaid latches when at the rearward end of its travel; and springs tending to maintain the rearward portions of the tracks in their normal position.

16. In grain shocking apparatus the combination of a sheaf gripping, carrying and depositing means comprising a carriage, longitudinal tracks; means for moving said carriage along said tracks; means for tilting said carriage from the vertical to the horizontal while it travels rearwardly and vice versa; a cross head slidable longitudinally of said carriage; sheaf gripping arms pivoted on said cross head; connections between the carriage and arms whereby the movements of the cross head open and close the arms; releasable locking means normally locking the cross head with the arms open and tending normally to assume the locking position; means for releasing the locking means prior to the tilting of the carriage; means for locking the arms in the closed position; and means for releasing the locking means automatically when the carriage is horizontal and at the rearward end of its travel.

Hamilton, Ont., this 6th day of October A. D. 1913.

JAMES HERVEY TALLMAN.

Signed in the presence of—
J. D. BEASLEY,
L. H. ROBERTSON.